United States Patent
Cui et al.

(10) Patent No.: US 9,394,926 B1
(45) Date of Patent: Jul. 19, 2016

(54) TORQUE CONVERTER

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 0 days.

(21) Appl. No.: 14/839,793

(22) Filed: Aug. 28, 2015

(51) Int. Cl.
*F16H 25/20* (2006.01)
*F15B 15/06* (2006.01)
*F16H 39/04* (2006.01)

(52) U.S. Cl.
CPC .............. *F15B 15/068* (2013.01); *F16H 39/04* (2013.01); *F16H 2025/2053* (2013.01)

(58) Field of Classification Search
CPC ........... F15B 15/068; F16H 2025/2053; F16H 25/2056; F16H 25/2233
See application file for complete search history.

(56) References Cited

U.S. PATENT DOCUMENTS

| 3,453,938 | A | | 7/1969 | Fewel |
| 3,706,202 | A | * | 12/1972 | Basa ....................... F15B 7/005 60/537 |
| 3,763,747 | A | | 10/1973 | Beichel et al. |
| 4,313,367 | A | | 2/1982 | Weyer |
| 4,508,016 | A | | 4/1985 | Weyer |
| 4,603,616 | A | | 8/1986 | Zajac |
| 4,741,250 | A | * | 5/1988 | Weyer ................ B60G 21/0553 74/424.92 |
| 5,447,095 | A | | 9/1995 | Weyer |
| 6,212,889 | B1 | | 4/2001 | Martin |
| 7,210,720 | B2 | * | 5/2007 | Kehler .................... E02F 3/404 294/106 |
| 7,950,300 | B2 | * | 5/2011 | Murata ................... F16H 25/20 74/25 |
| 8,904,917 | B2 | | 12/2014 | Rosenboom et al. |
| 2012/0079901 | A1 | | 4/2012 | Shu |

FOREIGN PATENT DOCUMENTS

DE    25 17 456 A1    10/1976

* cited by examiner

*Primary Examiner* — F. Daniel Lopez
(74) *Attorney, Agent, or Firm* — Richard C. Litman

(57) ABSTRACT

The torque converter includes an elongate housing having a main section and a collar section. A piston assembly is reciprocable inside the main section. A plurality of elongate helical bolts with outer helix extends axially from one side of a piston. The opposite side of the piston is entirely exposed to hydraulic forces to maximize potential work thereon. The helical bolts are mated with a rotator in a helical rotation assembly, converting linear motion into rotation, each mated pair generating a given torque. A torque accumulator combines the given torque to generate total output torque greater than the given torque. One or more output endcaps can be provided on the ends of the housing to produce work from the greater output torque.

16 Claims, 11 Drawing Sheets

TORQUE CONVERTER

BACKGROUND OF THE INVENTION

1. Field of the Invention

The present invention relates to actuators, and particularly to a torque converter that converts a given input torque into higher torque.

2. Description of the Related Art

A typical rotary actuator, especially a hydraulic type rotary actuator, utilizes mating helical components to convert linear motion into rotary motion. The helical components include a piston sleeve that has a helix formed on both outer and inner surfaces. The inner helix of the piston is mated to an outer helix on a rotary drive shaft, while the outer helix on the piston is mated to a fixed inner helix of the actuator housing. When hydraulic force acts on the face of the piston, this causes the piston to reciprocate within the housing and rotate the drive shaft.

A theoretical work output (W) for this type of rotary actuator is determined by the hydraulic force (F) acting on the piston multiplied by the travel distance of the piston (S), as represented by the equation, $W = F \times S$. The total work ($W_{work\ total}$) for this actuator can be converted into output torque ($T_{torque\ output}$), as represented by the equation, $W_{work\ total} = T_{torque\ output}$. Note that for a given force input, the input force acting on the piston face increases proportionally with the area of the face, since seals and the housing limit the maximum hydraulic pressure. Therefore, the relationship between the piston area and the piston travel distance determine work output or torque, and helical factors have no bearing on this relationship.

Although compact and efficient, such a rotary actuator does not produce the full potential of its piston configuration. For example, the face of the piston is annular, which is much less area than the cross section of the housing. The compact nature of the actuator and the relatively large pitch angle employed therein also limits the travel distance of the piston. These factors reduce the potential work output. Moreover, this type of actuator is relatively difficult to manufacture due, in part, to the various helixes that need to be machined or formed, both inside and outside the various components. The nature and work of these actuators also require a variety of specialized seals to prevent leakages in high-pressure fluid environments. Furthermore, these actuators are typically custom-made for particular applications. There are no set standards for producing these types of actuators, which limits customization and expansion without resorting to more costly expenses of custom manufacture.

There is a need for a piston-type actuator that can more fully maximize work or torque output within a relatively compact and simple device. Thus, a torque converter solving the aforementioned problems is desired.

SUMMARY OF THE INVENTION

The torque converter includes an elongate housing having a main section and a collar section. A piston assembly is disposed for reciprocation inside the main section. A plurality of elongate helical bolts having an outer helix extends axially from one side of the piston. The opposite side of the piston is entirely exposed to hydraulic forces to maximize potential work. The helical bolts mate with a rotator in a helical rotation assembly, converting linear motion into rotation, each mated pair generating a given torque. A torque accumulator combines the given torques to generate an output torque greater than each given torque. One or more output endcaps can be provided on the ends of the housing to produce work from the greater output torque. Both hydraulic and mechanical embodiments are disclosed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
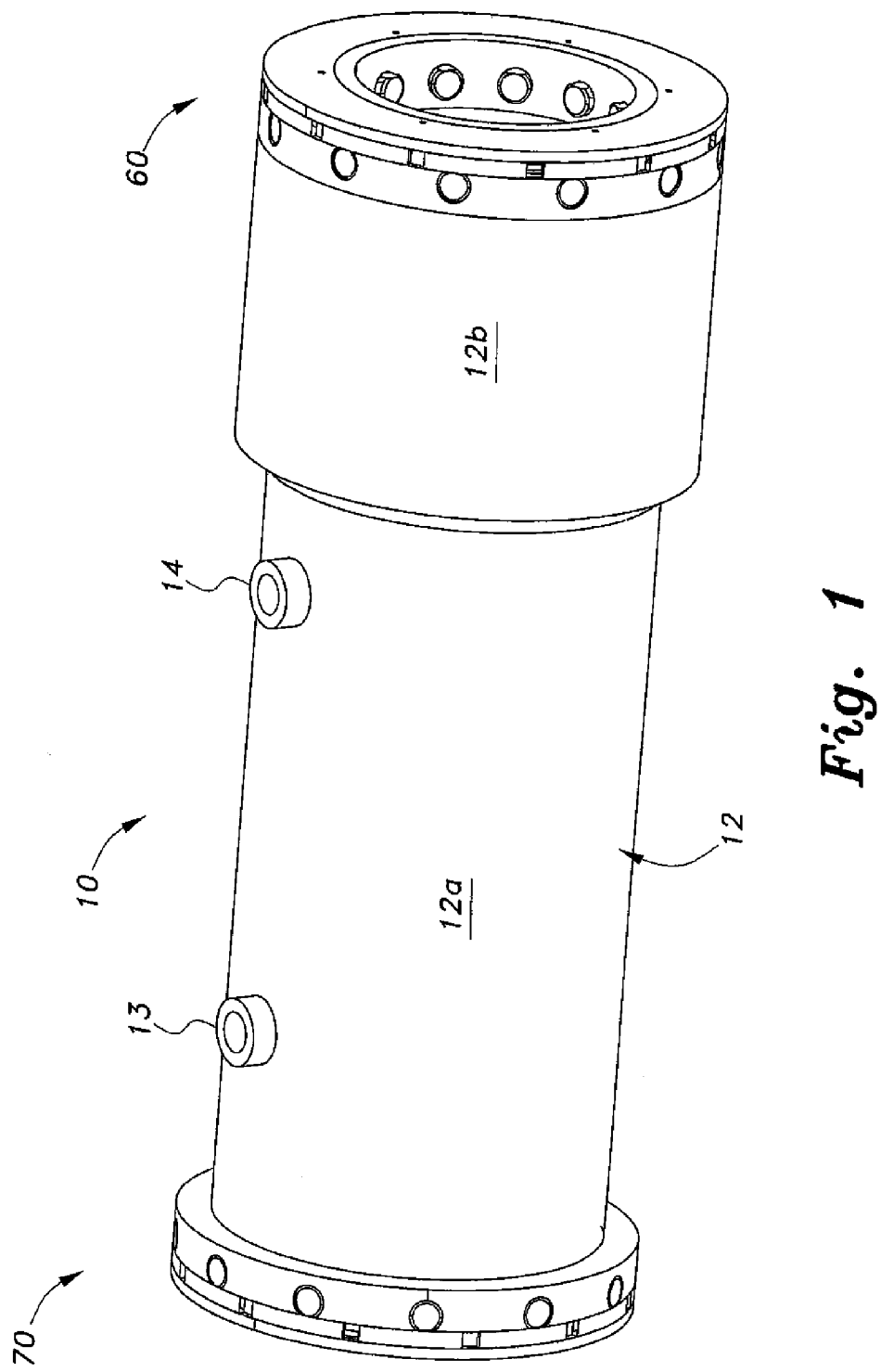
FIG. 1 is a perspective view of a first embodiment of a torque converter according to the present invention.
Figure 2:
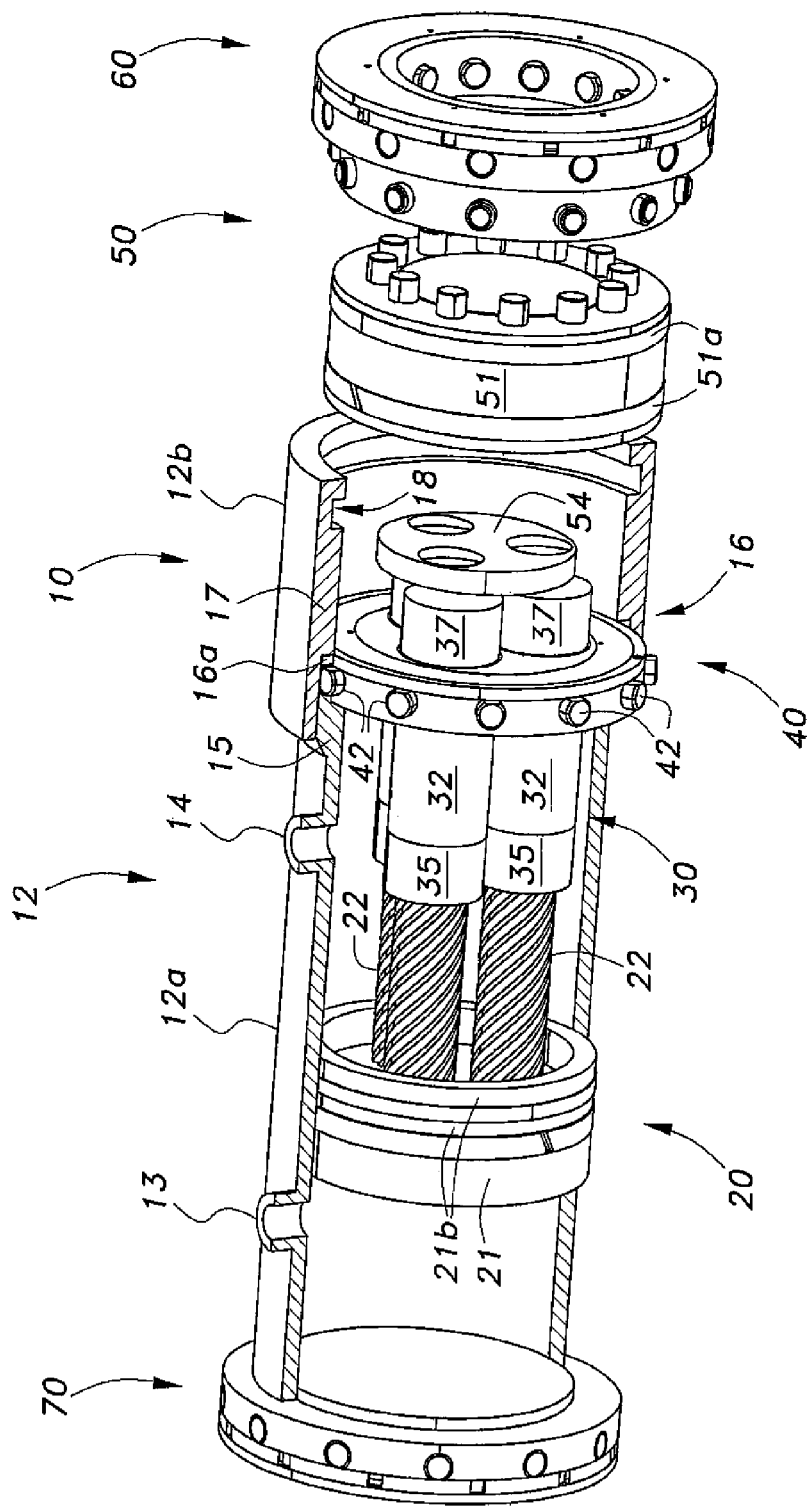
FIG. 2 is a partially exploded perspective view of the torque converter of FIG. 1, the housing being broken away and in section.
Figure 3:
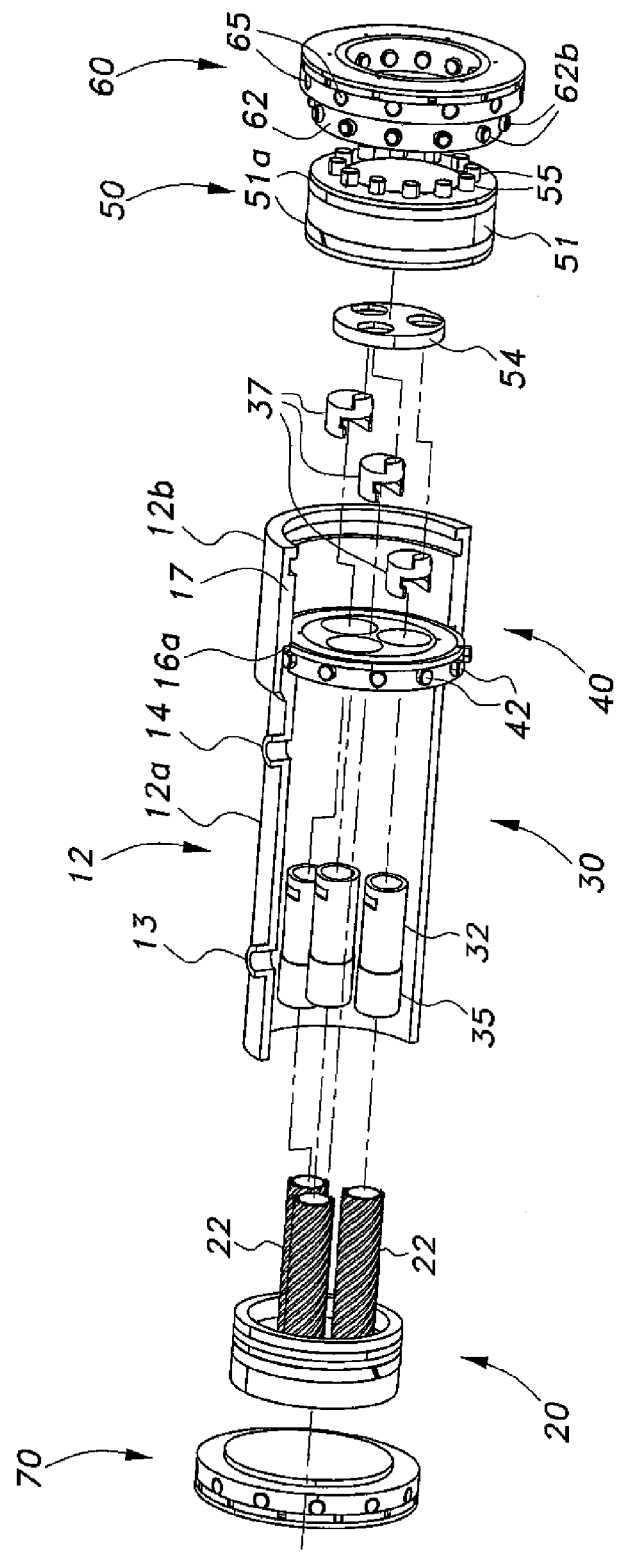
FIG. 3 is an exploded perspective view of the torque converter of FIG. 1, portions of the housing being omitted for clarity.

The torque converter, a first embodiment of which is referred to by the reference number 10, generates increased torque by accumulation of a plurality of smaller torque inputs. As best seen in FIGS. 1-4, the torque converter 10 is a type of hydraulic actuator converting linear motion of a reciprocating piston into rotary motion. The torque converter 10 includes a housing 12 having an input end and an opposite output end. A piston assembly 20 is disposed inside the housing 12 and reciprocates therein. The piston assembly 20 engages a helical rotation assembly 30 to convert linear motion of the piston assembly 20 into rotary motion of one or more rotators 31. A torque accumulator 50 is coupled to the rotators 31 to combine the rotary motion of the rotators 31 into total output torque that is substantially the sum of the individual input torques of the rotators 31.

The housing 12 comprises two parts, a main section 12a and a coaxial collar section 12b. The main section 12a is preferably an elongate, generally cylindrical tube having an input end and an output end. A first fluid port 13 is provided near the input end to introduce hydraulic fluid therethrough and push the piston assembly 20 towards a working direction from a ready position. The direction and the motion of the piston assembly 20 can also be referred to as a working stroke. A second fluid port 14 extends near the middle of the main section 12a past the maximal extension of the piston assembly 20 in order to push the piston 21 of the piston assembly 20 in the opposite direction, back into the ready position.

The output end of the housing 12, i.e., the collar section 12b, houses components that facilitate output torque. The collar section 12b may also be constructed as a separate or an integral, unitary component.

Figure 4:
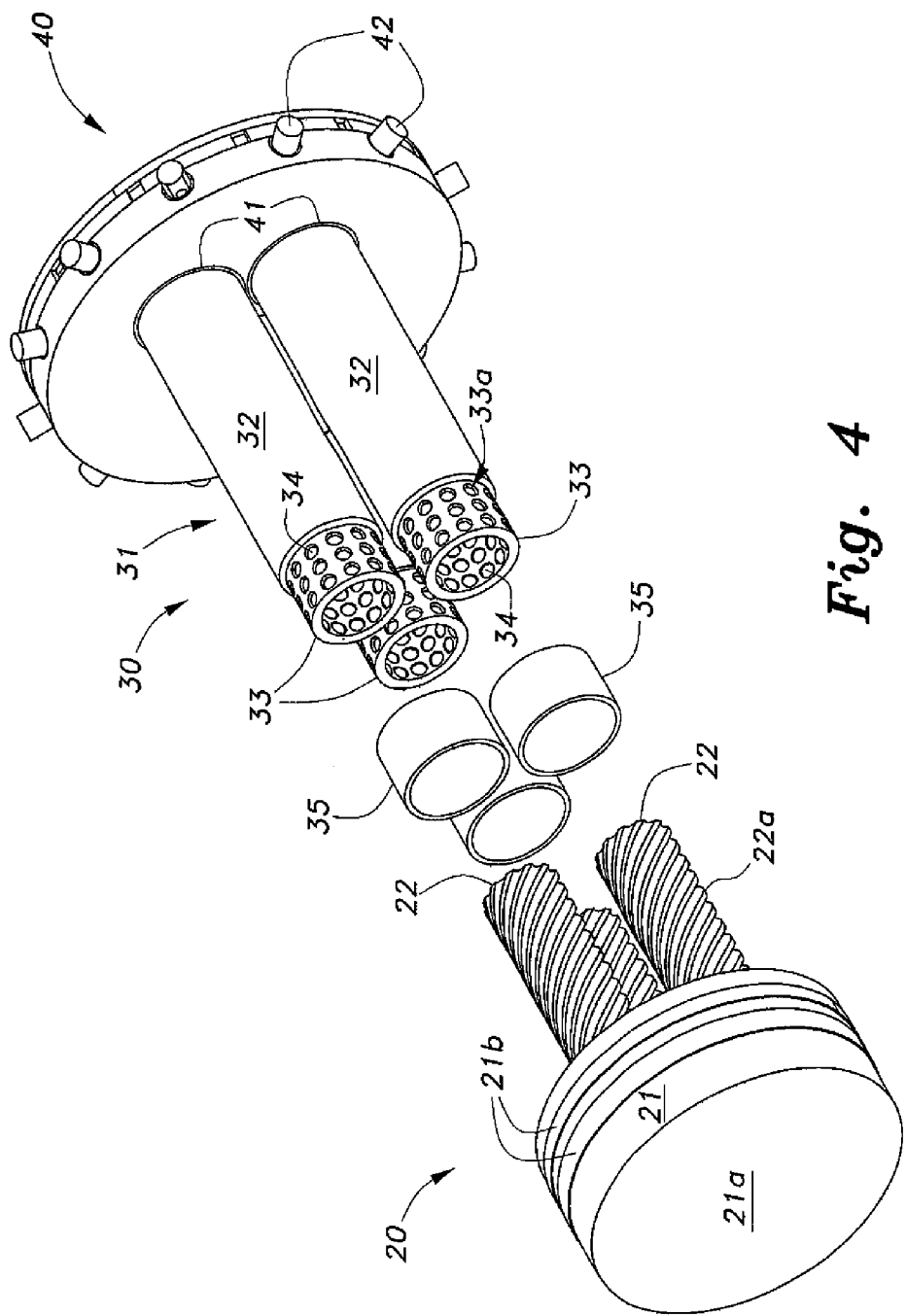
FIG. 4 is an exploded perspective view of a piston assembly/helical rotation assembly of the torque convertor of FIG. 2.

In this embodiment, the piston assembly 20 includes a reciprocating piston 21 having a planar face 21a on one side, as shown in FIG. 4. Unlike the conventional rotary actuator mentioned above, substantially the entire face 21a of the piston 21 is exposed to hydraulic force during operation, which maximizes work that can be performed by the piston 21. One or more O-rings 21b are mounted in respective annular recesses around the circumference of the piston 21 to seal the piston 21 within the housing 12 and substantially prevent potential fluid leaks during operation thereof. As shown, the O-rings 21b may be split rings to enable easier mounting during assembly.

One or more elongate, male helical bolts 22 extend axially from the opposite side of the piston 21. Preferably, the opposite side of the piston 21 defines a circular recess to reduce weight. The male helical bolts 22 are fixed to the piston 21, and a helix 22a of a given pitch is formed on the outer surface of each male helical bolt 22 along the length thereof. Each helical bolt 22 is preferably hollow in order to reduce weight, although they may be constructed as solid bolts.

As shown in FIG. 4, the piston assembly 20 mates with and reciprocates (i.e., provides linear motion) with respect to the helical rotation assembly 30. The helical rotation assembly 30 includes one or more rotators 31 rotatably mounted to a stop disc 40. Each rotator 31 is provided with an elongate, rotary sleeve 32 fitted through a respective bearing 41 angularly spaced in the stop disc 40, and each rotator 31 extends along parallel axes with respect to the stop disc 40.

Each rotary sleeve 32 is axially aligned with a corresponding helical bolt 22. Each rotary sleeve 32 is preferably an elongate, generally hollow cylinder having an inner diameter dimensioned to accommodate the diameter of the corresponding helical bolt 22. Each rotary sleeve 32 is preferably constructed with generally uniform thickness along the length thereof, except for the opposite ends. The proximal end (i.e., the end initially mating with the corresponding helical bolt 22) is a stepped socket 33 of reduced diameter from the central section of the rotary sleeve 32. The socket 33 includes a plurality of apertures 33a arranged in a predetermined pattern of the same pitch as that of the helix 22a on the helical bolt 22. A plurality of bearings 34, preferably ball bearings, seats within the apertures 33a. A protective bearing collar 35 slidably mounts around the socket 33 to trap, protect, and secure the bearings 34 therein. The bearing collar 35 is preferably dimensioned so that the outer diameter is generally flush with the diameter of the central section. It is noted, however, that the outer diameter of the bearing collar 35 can be smaller or larger, so long as the bearing collar 35 can secure the bearings 34 and withstand operational stresses.

This construction of the socket 33, bearings 34, and the bearing collar 35 enables the bearings 34 to securely and smoothly engage the grooves of the helix 22a on the helical bolt 22. In use, as the piston assembly 20 performs a working stroke, the engagement between the helix 22a and the bearings 34 forces the respective rotary sleeve 32 to rotate about its own axis. It has been found that this is a relatively inexpensive construction for converting linear motion into rotary motion, compared to machining an internal helix in the rotary sleeves 32. Other types of bearings, such as roller bearings and the like, can also be used. Moreover, the dimensions, number, and spacing of the helical bolts 22 and the rotary sleeves 32 do not have to be identical, so long as the same stroke length and pitch are maintained between corresponding mating pairs of helical bolts 22 and rotary sleeves 32. This is to insure that the corresponding rotary sleeves 32 rotate at identical rates.

Figure 5:
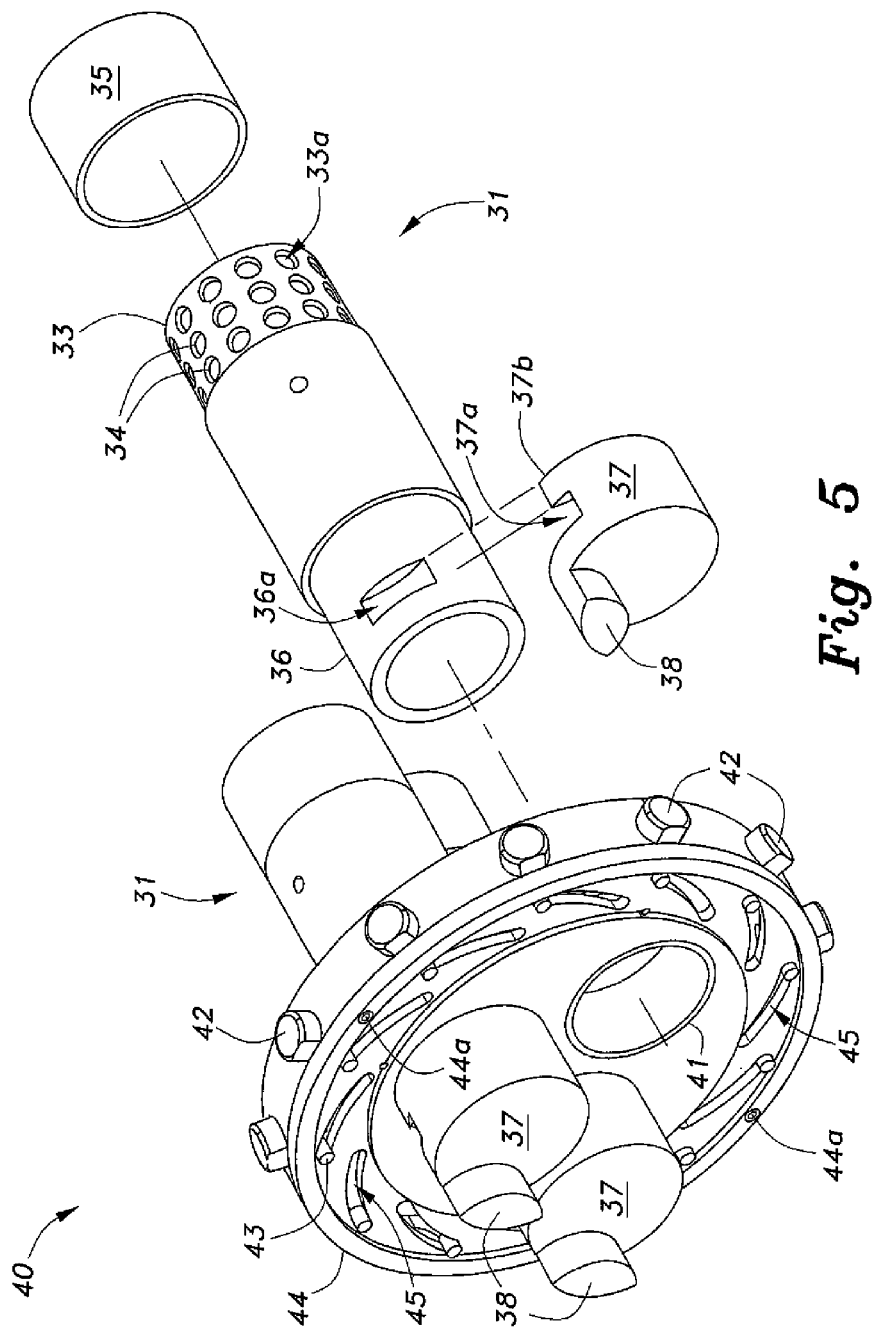
FIG. 5 is a partial exploded view of a helical rotation assembly of FIG. 4, part of the stop disc being omitted for clarity.

As shown in FIG. 5, the distal end of each rotary sleeve 32 is also stepped to form an output section 36 of reduced diameter on the rotary sleeve 32. The output section 36 includes diametrically opposed chordal mounting recesses 36a to enable mounting of a crank cap 37. The crank cap 37 is a generally elongate, cylindrical block having a T-shaped mounting groove 37a radially extending into the block at one end of the block, forming a pair of opposed mounting tabs 37b. When assembled, the mounting tabs 37b slidably seat into the chordal mounting recesses 36a to secure the crank cap 37. An offset or eccentric crank pin 38 extends axially from the opposite end. Due to the stresses experienced by the crank cap 37, the crank cap 37 is preferably constructed from a solid cylinder of a larger diameter than the center section of the rotary sleeve 32. Moreover, the portion of the mounting groove 37b that defines the mounting tabs 37b preferably does not extend far past the middle of the block to maintain strength and robust structural integrity of the crank cap 37.

As best seen in FIG. 4, the stop disc 40 rotatably supports the rotators 31 via the bearings 41 and prevents axial movement of the same. The stop disc 40 is provided with a plurality of locking pins 42 around the circumference of the stop disc 40. All the locking pins 42 are radially reciprocable and simultaneously actuable between a radially retracted, unlocked position and a radially extended, locked position. To facilitate selective locking and unlocking, the stop disc 40 includes an annular locking actuator 44. A plurality of guide slots 45 are formed and radially spaced on the locking actuator 44. Each guide slot 45 follows a curvilinear path based upon an Archimedian spiral. Each guide slot 45 slidably supports a follower 43 extending orthogonally from the respective locking pin 42. In use, rotation of the locking actuator 44 in one direction, e.g., counterclockwise in the view shown in FIG. 4, retracts the locking pins 42 simultaneously, while rotation in the clockwise or opposite direction simultaneously extends the locking pins 42. This type of radially engaging system is disclosed in a co-pending application, U.S. application Ser. No. 14/073,589, filed on Nov. 6, 2013, which is hereby incorporated by reference in its entirety. The operational position of the locking actuator 44 may be fixed by setscrews 44a.

The stop disc 40 is secured in the housing 12 by a mated portion between the main section 12a and the collar section 12b. The output end of the main section 12a includes a stepped lip 15 (shown in FIG. 2) that defines a part of a first annular recess 16. A plurality of locking apertures 16a is formed on the stepped lip 15 and circumferentially spaced thereon. The locking apertures 16a are aligned with the corresponding locking pins 42 to selectively receive the same when the locking pins 42 extend into the locked position. The stepped lip 15 forms a ledge, enabling the proximal side of the stop disc 40 (i.e., the side facing towards the piston assembly 20) to abut and seat within the first annular recess 16. The collar section 12b also includes a corresponding stepped lip 17 that covers the locking apertures 16a and forms the remainder of the first annular recess 16. The stepped lip 17 extends past the first annular recess 16 towards the closed end of the main section 12a to provide structure for securing the collar section 12b to the main section 12a by welding, threading, adhesive, and the like. The collar section 12b also includes a second annular recess 18 for securing an output endcap 60.

As best seen in FIGS. 2, 3, 6A, and 6B, all the crank pins 38 are operatively coupled to the torque accumulator 50. The torque accumulator 50 includes a cylindrical drive block 51 dimensioned to fit inside the collar section 12b. The drive block 51 is constructed much like the piston 21, at least in general shape, and includes one or more O-rings 51a mounted in corresponding annular recesses on the drive block 51 to seal the same and substantially prevent potential leakages. A circular recess 52 is formed on one side of the drive block 51. The wall of the recess 52 is preferably suitably long to cover the axial length of the crank caps 37 when assembled. A drive recess 53 is eccentrically formed on the floor of the circular recess 52. A circular drive plate 54 seats flush within the drive recess 53. The drive plate 54 includes one or more drive holes or apertures 54a configured to receive a corresponding crank pin 38 on the respective crank caps 37. This type of simultaneous actuating mechanism for parallel axis rotors is disclosed in co-pending application, U.S. application Ser. No. 14/637,361, filed on Mar. 3, 2015, which is hereby incorporated by reference in its entirety.

The torque accumulator 50 generates high output torque by combining all the torque from the rotators 31. As the rotators 31 are rotated by the linear motion of the piston assembly 20, all the crank caps 37 also rotate simultaneously about parallel axes at identical rates, each crank cap 37 generating a given torque. Since each crank cap 37 performs work on the common drive plate 54, the drive plate 54 gains the combined input torque from the crank caps 37, causing the drive plate 54 to orbit about the center axis of the drive block 51, which, in turn, rotates the drive block 51 within the collar section 12b.

Figure 6A:
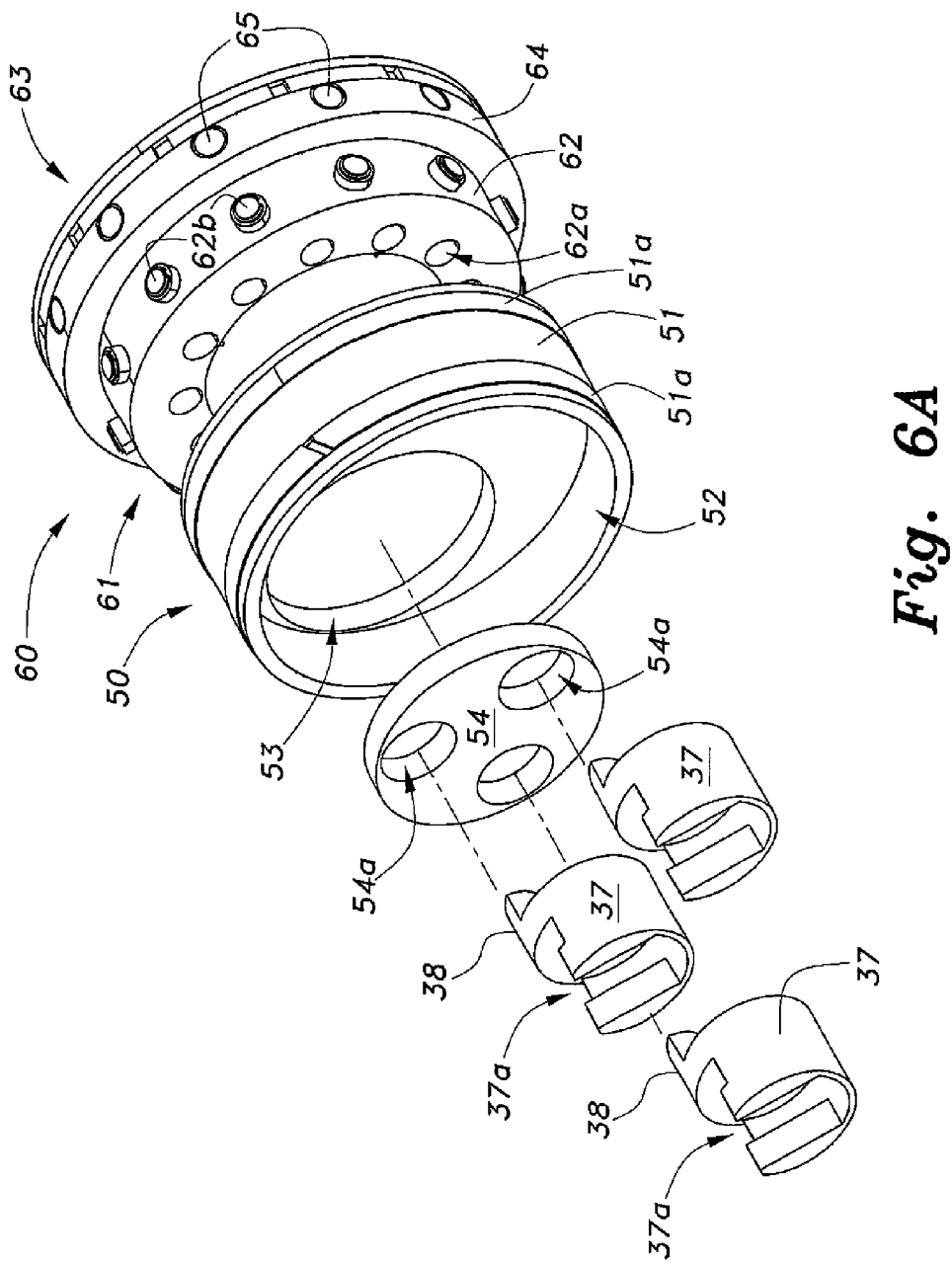
FIG. 6A is a partial exploded view of a torque accumulator and output endcap of the torque convertor of FIG. 2.
Figure 6B:
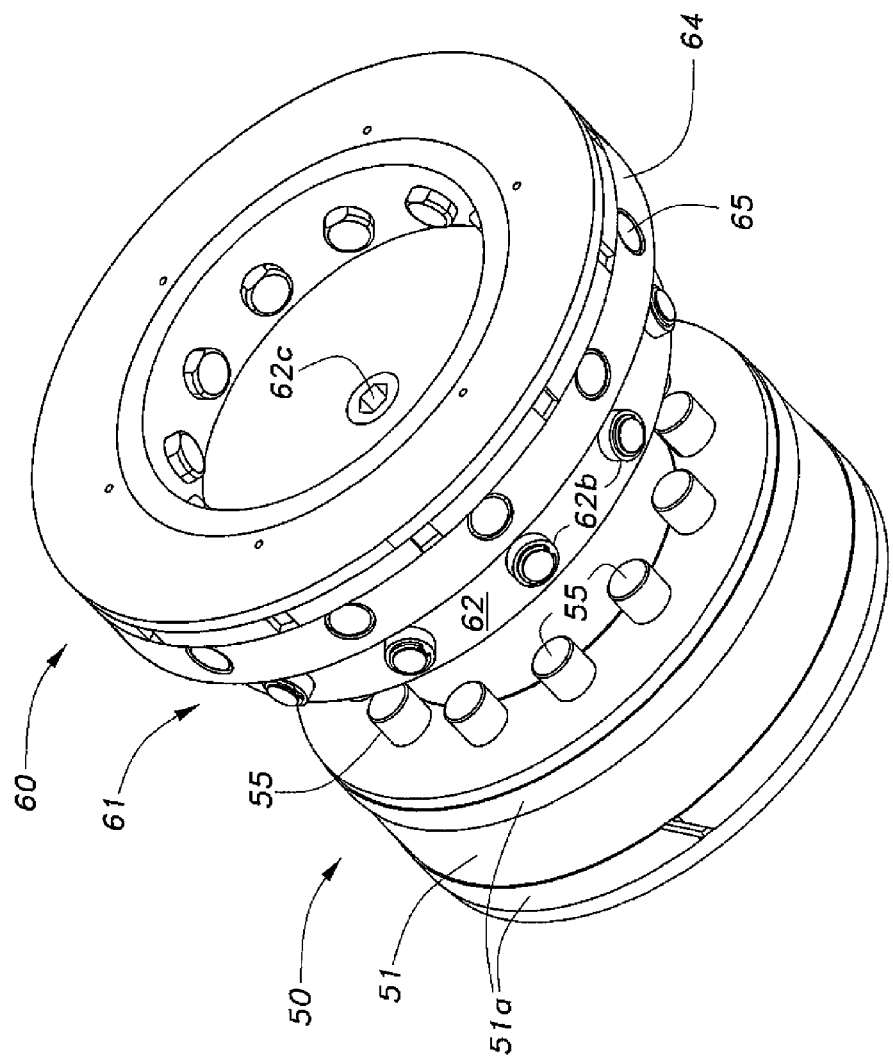
FIG. 6B is a perspective view of the torque accumulator and output endcap of FIG. 6A, shown from a different perspective.

The type of work that can be performed is best seen in FIGS. 6A and 6B. The drive block 51 is provided with a plurality of axially extending engagement pins 55 for selective engagement with the output endcap 60, the engagement pins 55 being angularly spaced near the periphery. The output endcap 60 is a stepped configuration including a first section 61 and a second section 63. The first section 61 may be configured as a circular driven block 62 having a diameter dimensioned to fit inside the distal end of the collar section 12b. The proximal face of the driven block 62 is provided with a plurality of angularly spaced engagement holes 62a, which are each aligned with a corresponding engagement pin 55 on the torque accumulator 50. When assembled, the engagements pins 55 insert into corresponding engagement holes 62a, and the output endcap 60 will be rotated by rotation of the torque accumulator 50. The driven block 62 also includes a plurality of extendable bearings 62b circumferentially spaced around the driven block 62. Selective extension and retraction of the bearings 62b may be facilitated by a similar radial engagement system to the system employed in the stop disc 40, described above. To facilitate selective extension and retraction, a bearing actuator 62c, such as a hex nut or the like, can be disposed on the opposite side of the driven block 62. When assembled, operation of the bearing actuator 62c extends the bearings 62b into the second annular recess 18 in the interior of the collar section 12b. The bearings 62b ride within the second annular recess 18 during use to permit relatively easy rotation of the driven block 62 with respect to the collar section 12b. This is a first step of a two-stage engagement process for the torque converter 10.

The second section 63 may be configured as an annular block 64 having a diameter larger than the driven block 62 and dimensioned to completely cover the open, distal end of the collar section 12b. The annular block 64 is provided with a plurality of circumferentially spaced locking pins 65 for selective engagement with another structure, such as a pipe or opening. Utilizing a system similar to the radial engagement system employed in the stop disc 40, described above, rotation of the driven block 62 enables selective extension or retraction of the locking pins 65, completing the second step in the two-stage engagement process. The main section 12a can also be provided with an input endcap 70 similar in construction to the second section 63, except that the annular block 64 would be closed at one end.

Although the above-described work is in relation to radial engagement of parts, it is to be realized that the torque convertor 10 can be used in any work situation that can benefit from increased torque. For example, the output endcap 60 can be configured as a rotating lever for lifting heavy objects or as a torqueing mechanism for fasteners.

Figure 7:
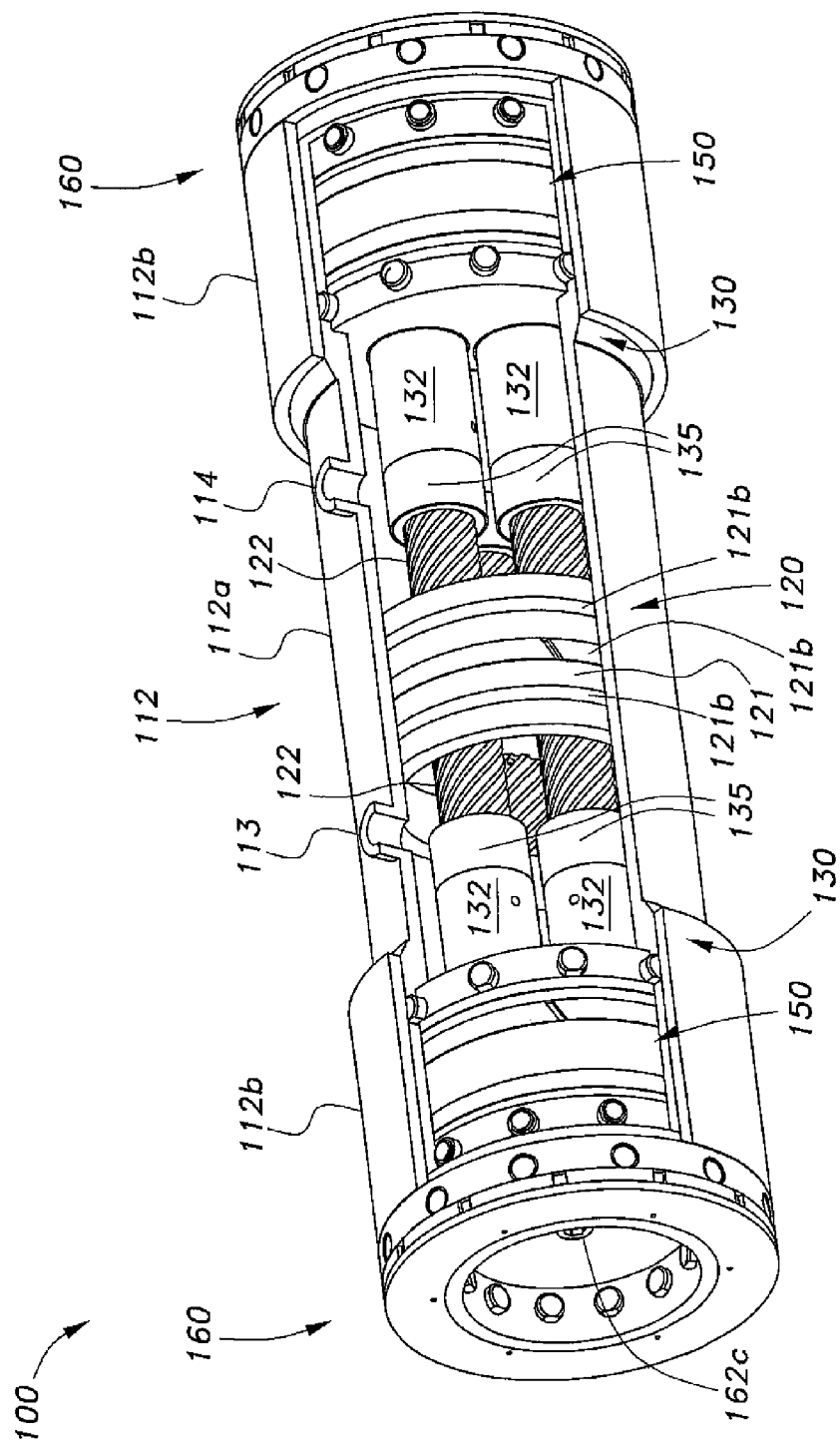
FIG. 7 is a perspective view of a second embodiment of a torque convertor according to the present invention, shown with the housing broken away and partially in section.

A second embodiment of a torque converter 100 is shown in FIG. 7. This embodiment is similar to the first embodiment, except that the torque converter 100 is configured to capitalize on a double-acting hydraulic piston assembly. Since the majority of the components are similar, the following description will concentrate on the differences for brevity and clarity. A reference numbering scheme has been used similar to that in the "100" series.

In this embodiment, the torque converter 100 is provided with a pair of opposing output endcaps 160 coupled to opposing collar sections 112b on the housing 112. The piston assembly 120 includes a piston 121 having one or more elongate, helical bolts 122 extending axially from both faces of the piston 121. Each set of helical bolts 122 is coupled to respective helical rotation assemblies 130 to convert the linear motion of the helical bolts 122 to rotation of the respective rotary 132. The input from the respective helical rotation assemblies 130 provides the driving force on the respective torque accumulators 150 to produce greater torque for ultimate output to the output endcaps 160.

Instead of performing a working stroke in a single direction, as in the torque converter 10, the torque converter 100 enables work in both directions of reciprocation by the piston 121. As shown, the first fluid port 113 provides hydraulic force to move the piston 121 to the right, while the second fluid port 114 provides hydraulic force to move the piston 121 to the left, the attached helical bolts 122 performing work in each direction to rotate both endcaps 160.

Figure 8:
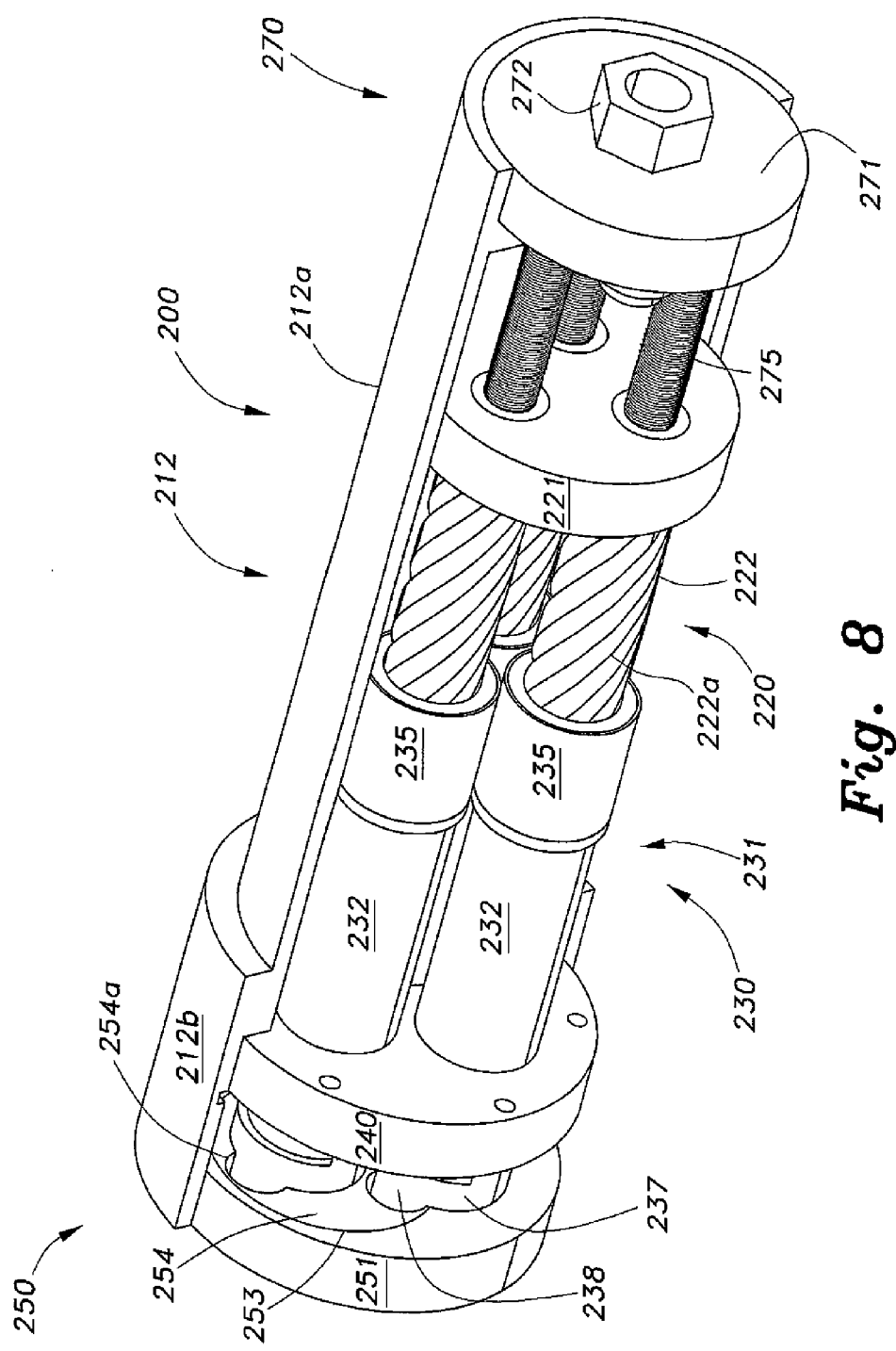
FIG. 8 is a perspective view of a third embodiment of a torque convertor according to the present invention, shown with the housing broken away and partially in section.
Figure 9:
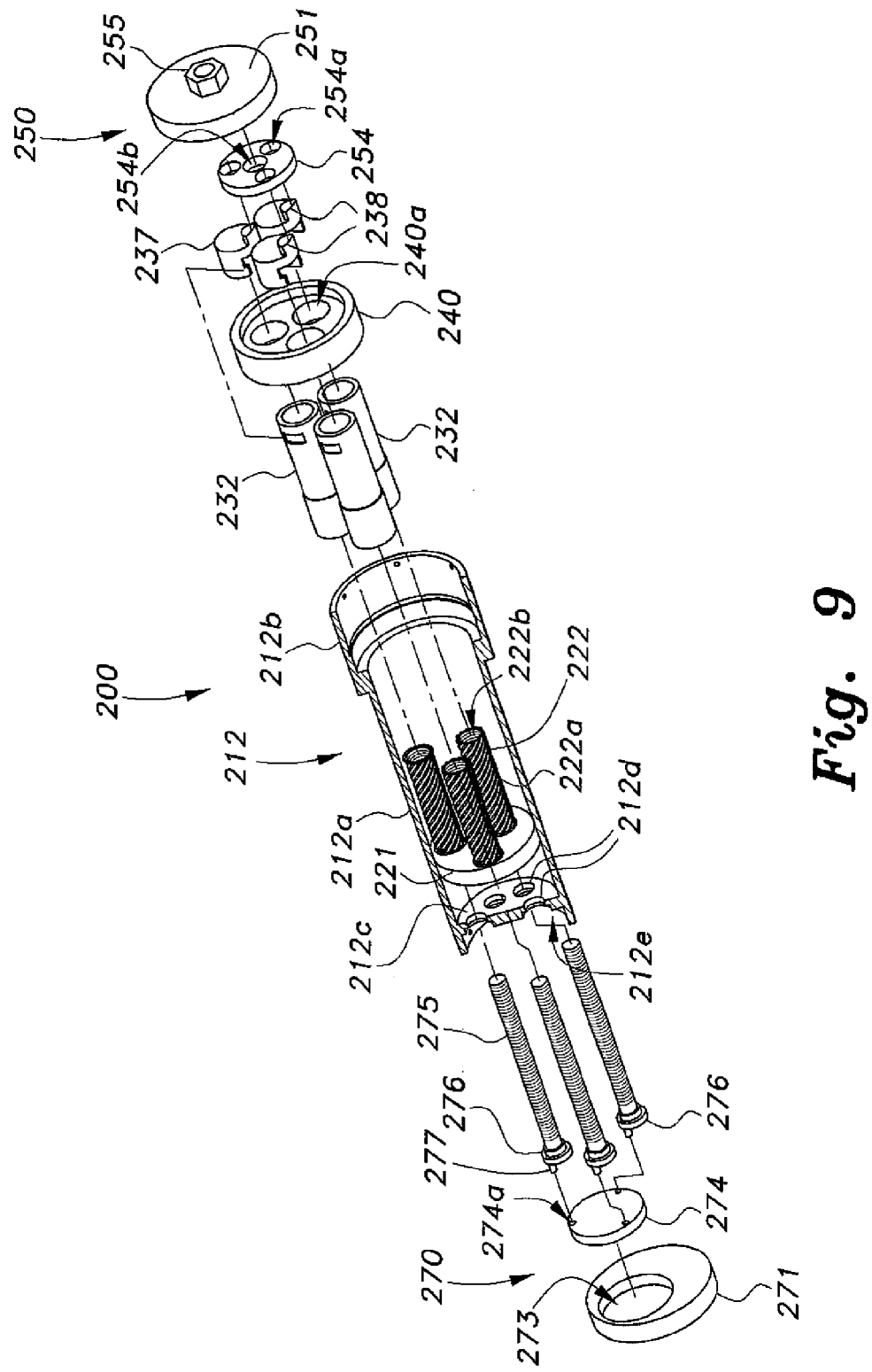
FIG. 9 is an exploded perspective view of the torque convertor of FIG. 8, shown with the housing broken away and partially in section.
Figure 10:
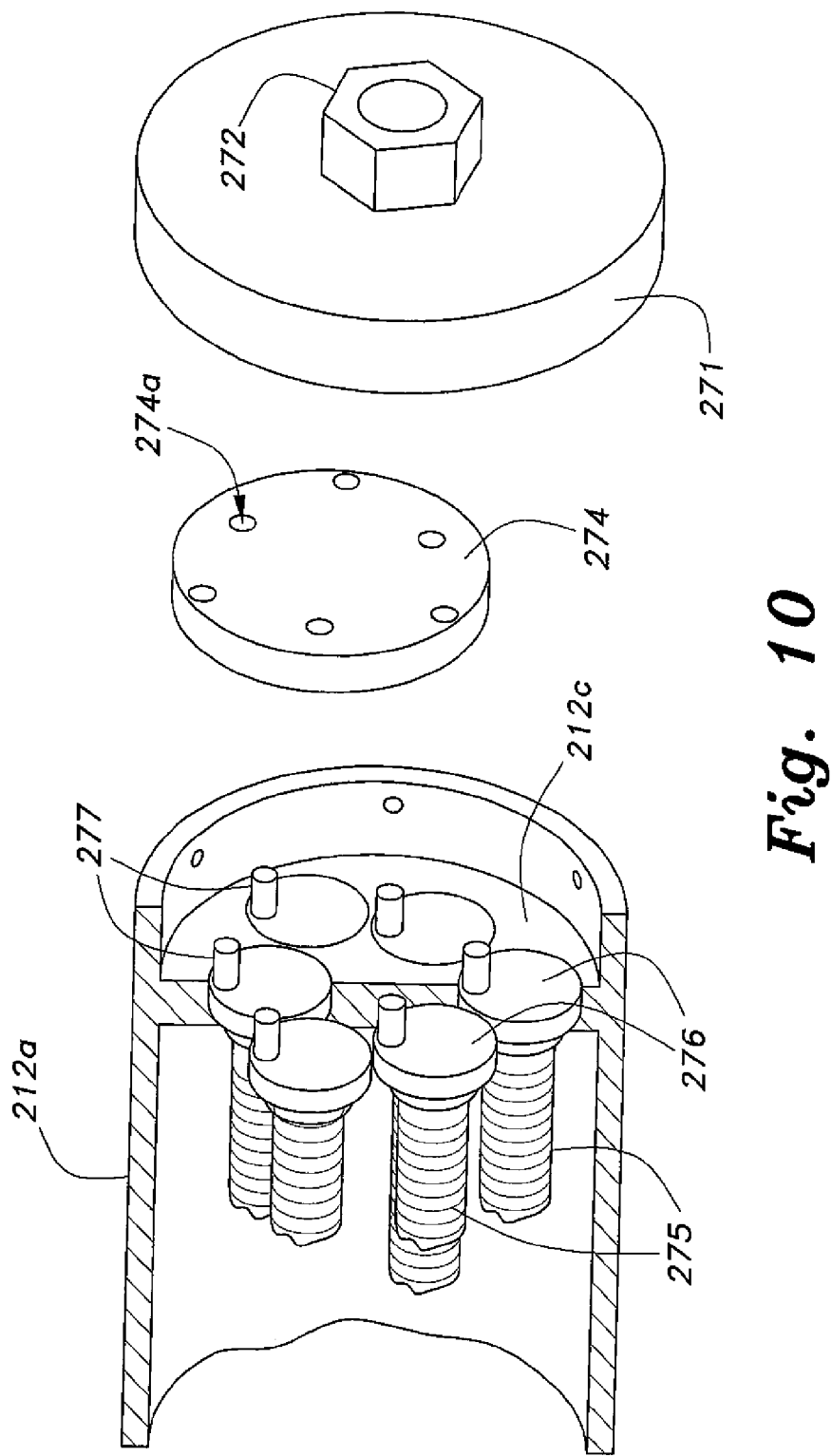
FIG. 10 is a partial perspective view of the input end of the torque convertor of FIG. 8.

A third embodiment of a torque converter 200 is shown in FIGS. 8-10. This embodiment is a mechanical version of the previous embodiments where the motive force is provided by mechanical means, rather than hydraulic fluid. Similar components follow a reference numbering scheme similar to the "200" series, as in the previous embodiments, and details thereof have not been set forth for brevity and clarity.

As shown, the torque converter 200 includes a housing 212 having an input end and an opposite output end. A piston assembly 220 is disposed inside the housing 212 and reciprocates therein. The piston assembly 220 engages a helical rotation assembly 230 to convert linear motion of the piston assembly 220 into rotary motion of one or more rotators 231. A torque accumulator 250 is coupled to the rotators 231 to combine the rotary motion of the rotators 231 into a total output torque that is substantially the sum of the individual input torques of the rotators 231.

The housing 212 comprises two parts, a main section 212a and a coaxial collar section 212b at the output end. An input assembly 270 is provided at the input end to drive the piston assembly 220. The input end of housing 212 includes a support partition or baffle 212c disposed below the opening at the input end to define a recess or cavity 212e. The recess 212e is configured to receive and securely seat a driver endcap 271 of the input assembly 270. The driver endcap 271 is preferably a circular disc having a power input coupling 272 extending axially from one side or face of the driver endcap 271. The power input coupling 272 may be a nut that can be connected to a motor or tool to positively rotate the driver endcap 271.

The opposite side or face of the driver endcap 271 includes a circular driver recess 273 eccentrically formed thereon. A circular driver disc 274 seats flush within the driver recess 273 and includes a plurality of driver holes or apertures 273*a* angularly spaced thereon. A plurality of elongate, threaded driver rods 275 is rotatably coupled to the driver disc 274 by a crank head 276 disposed at one end of each threaded driver rod 275. The threading of the driver rod 276 is of a given pitch. Each crank head 276 is provided with an axially extending crank pin 277 positioned at an offset or eccentric from the axis of rotation of the corresponding driver rod 275, the crank pins 277 being configured to be inserted into respective driver holes 273*a* on the driver disc 274. The support partition 212*c* includes a plurality of bores 212*d* to rotatably support the driver rods 275 inserted therethrough near the crank heads 276. Rotation of the driver endcap 271 from a power input source causes the driver disc 274 to rotate within the driver recess 273, while the driver disc 274 follows an orbital path. This compound motion concurrently rotates the crank heads 276 connected to the driver disc 274. This construction can be construed as a torque distributor to the extent that a given input from the power input source is distributed to discrete rotator elements in the form of the driver rods 275.

In this embodiment, the piston assembly 220 includes a reciprocating piston 221 and a plurality of male helical bolts 222 extending axially from one side or face of the piston 221. The helical bolts 222 are mounted to the piston 221, and each helical bolt 222 is provided with both an outer helix 222*a* of a given pitch and an inner threaded bore 222*b* where the pitch of the threaded inner bore 222*b* matches that of the driver rods 275. The piston 221 includes holes coaxially aligned with the threaded bores 222*b*. When assembled, the driver rods 275 thread into corresponding helical bolts 222 via the threaded bores 222*b* through the holes on the piston 221. This connection between the driver rods 275 and the helical bolts 222 enables the piston 221 to reciprocate within the housing 212 upon rotation the driver rods 275. It is noted that the number of driver rods 275 and helical bolts 222 do not have to be equal nor do they need to be coaxial. So long as the driver rods 275 can facilitate linear movement of the piston 221, the number and positioning of the driver rods 275 and the helical bolts 222 can be varied.

The piston assembly 220 mates with and reciprocates (i.e. provides linear motion) with respect to the helical rotation assembly 230. The helical rotation assembly 230 includes one or more rotators 231 rotatably mounted to a stop disc 240. Each rotator 231 is provided with an elongate, rotary sleeve 232 fitted through respective, angularly spaced holes 240*a* on the stop disc 240, and each rotator 231 extends along parallel axes with respect to the stop disc 240. In all other respects, the rotary sleeves 232 are similar in construction to the previously described rotary sleeves 32, 132, including crank caps 237 and corresponding crank pins 238.

All the crank pins 238 are operatively coupled to the torque accumulator 250. The torque accumulator 250 includes a circular drive block 251 dimensioned to fit inside the collar section 212*b*. A drive recess 253 is eccentrically formed on one side or face of the drive block 251, and a circular drive plate 254 seats flush within the drive recess 253. The drive plate 254 includes one or more drive holes or apertures 254*a* configured to receive a corresponding crank pin 238 on the respective crank caps 237. The opposite side or face of the drive block 254 is provided with an output coupling 255 for selective attachment of various work, such as to rotate attached implements or to torque fasteners.

The torque convertor 200 can generate relatively high torque conversions from relatively small input torque from the plurality of driver rods 275. The torque conversion is dependent upon the relationship between the thread pitch of the driver rods 275 and the helix pitch of the helical bolts 222, instead of upon a gearbox or special gearing arrangement. For example, relatively small thread pitch on the drive rods 275 and relatively large pitch on the helix bolts 222 in a 1:100 ratio can yield a 100-fold increase in output torque with a proportional decrease in output speed.

It is to be understood that the present invention is not limited to the embodiments described above, but encompasses any and all embodiments within the scope of the following claims.

We claim:

1. A torque converter, comprising:
    an elongate housing, the housing includes an elongate main section and at least one collar section axially attached to the main section, wherein the main section comprises a first fluid input port and a second fluid input port spaced from the first fluid input port;
    a piston assembly disposed for reciprocation along an axis of reciprocation within the housing, the piston assembly having a plurality of elongate male helical bolts extending therefrom, the helical bolts being angularly spaced about the axis of reciprocation along parallel axes, wherein the first fluid input port and the second fluid input port selectively adapted to provide hydraulic force on the piston assembly;
    a helical rotation assembly coupled to the piston assembly, the helical rotation assembly having a corresponding plurality of rotators linked to the helical bolts, the rotators each having a given output torque; and
    a torque accumulator coupled to the rotators, the torque accumulator simultaneously combining the given output torque from each of the rotators to generate a total output torque greater than the given output torque of a single one of the rotators.

2. The torque converter according to claim 1, wherein said piston assembly comprises a piston disposed for reciprocation within said housing, the piston having a face entirely exposed to hydraulic force on one side, said plurality of helical bolts being mounted to the opposite side of the piston and extending axially therefrom, each said helical bolt having an outer helix of a given pitch.

3. The torque converter according to claim 1, wherein each said rotator has an elongate, rotary sleeve axially aligned with a corresponding said helical bolt, each said helical bolt having an outer helix of a given pitch, each of the sleeves having a socket end, the socket end having a plurality of apertures arranged in a predetermined pattern matching the given pitch of the outer helix of said helical bolt, the sleeve further having an output section on an opposite end of the sleeve, the output section generating the given output torque, said helical rotation assembly further comprising:
    a plurality of bearings seated within the plurality of apertures in the sleeves;
    a bearing collar slidably mounted around each of the sockets to trap, protect, and secure the bearings; and
    a stop disc mounted between the main section and the collar section of said housing, the stop disc having a plurality of bores defined therein, each of the sleeves being rotatably supported in a corresponding one of the bores, the bearings engaging the outer helix of said corresponding helical bolt to facilitate smooth rotation of said rotary sleeve during reciprocating movement of said corresponding helical bolt.

4. The torque converter according to claim 3, wherein said output section has chordal mounting recesses formed on diametrically opposing sides of said output section, said output section further comprising a crank cap mounted to the chordal mounting recesses, the crank cap having an eccentric crank pin extending axially from one end thereof.

5. The torque converter according to claim 3, wherein said stop disc comprises:
   a plurality of locking pins arranged circumferentially around said stop disc, each of the locking pins being radially retractable into an unlocked position and radially extendable into a locked position; and
   an annular locking actuator coupled to said plurality of locking pins, the locking actuator having a plurality of guide slots formed therein, each of the locking pins having a follower riding inside a corresponding guide slot;
   wherein selective rotation of the locking actuator in one direction extends the plurality of locking pins into the locked position, and rotation of the locking actuator in an opposite direction retracts the locking pins into the unlocked position.

6. The torque converter according to claim 5, wherein said housing has a first annular recess formed at a mating portion between the main section and the at least one collar section, the first annular recess having a plurality of angularly spaced locking apertures to selectively receive the locking pins of said stop disc to fix relative position of said stop disc.

7. The torque converter according to claim 3, wherein said torque accumulator comprises:
   a cylindrical drive block mounted inside said at least one collar section, the drive block having a circular recess formed on one side thereof and a drive recess eccentrically formed on a floor of the circular recess; and
   a drive plate rotatably mounted inside the drive recess, the drive plate having a plurality of drive holes adapted to receive a corresponding output section of each of said rotary sleeves, the drive plate combining the given torque from each said output section to rotate and follow an orbital path about an axis of rotation of the drive block, causing the drive block to also rotate and generate greater torque.

8. The torque converter according to claim 7, further comprising a plurality of engagement pins extending axially from an opposite side of said drive block, the plurality of engagement pins being adapted for engagement with an output endcap and drive the same.

9. The torque converter according to claim 1, further comprising an output endcap coupled to an end of said at least one collar section, said torque accumulator being coupled to the output endcap to drive the output endcap.

10. The torque converter according to claim 1, wherein said at least one collar section comprises a pair of collar sections, each of the collar sections being connected to an end of said main section.

11. The torque converter according to claim 10, wherein said piston assembly comprises a piston disposed for reciprocation within said housing, the piston having one set of said plurality of helical bolts extending axially from one side of the piston and another set of said plurality of helical bolts extending from an opposite side of the piston, said first fluid input port generating a working stroke on the piston in one direction and said second fluid input port generating a working stroke in the opposite direction.

12. The torque converter according to claim 1, further comprising an input assembly coupled to one end of said main section, said input assembly selectively driving said piston assembly.

13. The torque converter according to claim 12, wherein said input assembly comprises:
   a support partition disposed inside said main section, the support partition defining a recess and having a plurality of angularly spaced holes defined therein;
   a driver endcap mounted inside the recess, the driver endcap having a power input coupling extending axially from one side of the driver endcap, the power input coupling adapted to be coupled to a source of motive power;
   a circular driver recess eccentrically formed on an opposite side of the drive endcap;
   a circular driver disc seated within the driver recess, the driver disc having a plurality of driver holes angularly spaced therein;
   a plurality of elongate, threaded driver rods rotatably coupled to the driver disc, each of the threaded driver rods having a relatively small thread pitch, each of the driver rods extending through the holes on the support partition, each of the driver rods being adapted to be threaded into a corresponding said helical bolt; and
   a crank head disposed at one end of each of the threaded driver rods, each of the crank heads having an eccentric crank pin mounted to a corresponding one of the driver holes;
   wherein rotation of the driver endcap by selective coupling to the motive power source rotates the driver rods to reciprocate said piston assembly.

14. The torque converter according to claim 13, wherein said plurality of helical bolts comprises at least one bolt having an elongate, internally threaded bore adapted to receive one of said driver rods and be linearly moved by rotation of said one of said driver rods.

15. The torque converter according to claim 13, wherein said plurality of helical bolts comprises an outer helix formed on each said helical bolt, the outer helix having a relatively larger pitch than the thread pitch of said plurality of driver rods, pitch ratio between said helical bolts and said driver rods determining extent of greater work output torque.

16. A torque converter, comprising:
   an elongate housing including an elongate main section and at least one collar section axially attached to the main section, wherein the main section comprises a first fluid input port and a second fluid input port spaced from the first fluid input port;
   a piston assembly disposed for reciprocation along an axis of reciprocation within the housing, the piston assembly having a plurality of elongate male helical bolts extending therefrom, the helical bolts being angularly spaced about the axis of reciprocation along parallel axes, wherein the first fluid input port and the second fluid input port selectively adapted to provide hydraulic force on the piston assembly;
   a helical rotation assembly coupled to the piston assembly, the helical rotation assembly comprising:
      a corresponding plurality of rotators linked to the helical bolts, the rotators each having a given output torque, each said rotator has an elongate, rotary sleeve axially aligned with a corresponding said helical bolt, each said helical bolt having an outer helix of a given pitch, each of the sleeves having a socket end, the socket end having a plurality of apertures arranged in a predetermined pattern matching the given pitch of the outer helix of said helical bolt, the sleeve further having an output section on an opposite end of the sleeve, the output section generating the given output torque;
a plurality of bearings seated within the plurality of apertures in the sleeves;
a bearing collar slidably mounted around each of the sockets to trap, protect, and secure the bearings; and
a stop disc mounted between the main section and the collar section of said housing, the stop disc having a plurality of bores defined therein, each of the sleeves being rotatably supported in a corresponding one of the bores, the bearings engaging the outer helix of said corresponding helical bolt to facilitate smooth rotation of said rotary sleeve during reciprocating movement of said corresponding helical bolt; and
a torque accumulator coupled to the rotators, the torque accumulator simultaneously combining the given output torque from each of the rotators to generate a total output torque greater than the given output torque of a single one of the rotators.

* * * * *